(12) United States Patent
Matsuo

(10) Patent No.: US 12,169,003 B2
(45) Date of Patent: Dec. 17, 2024

(54) WET-TYPE FRICTION ENGAGING DEVICE

(71) Applicant: JATCO LTD, Fuij (JP)

(72) Inventor: Michinori Matsuo, Shizuoka (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 17/406,153

(22) Filed: Aug. 19, 2021

(65) Prior Publication Data

US 2023/0055437 A1    Feb. 23, 2023

(51) Int. Cl.
| | |
|---|---|
| *F16D 13/72* | (2006.01) |
| *F16D 13/64* | (2006.01) |
| *F16D 13/52* | (2006.01) |
| *F16D 13/74* | (2006.01) |

(52) U.S. Cl.
CPC ........... *F16D 13/72* (2013.01); *F16D 13/648* (2013.01); *F16D 13/52* (2013.01); *F16D 13/74* (2013.01)

(58) Field of Classification Search
CPC .................................................. F16D 13/00–76
See application file for complete search history.

(56) References Cited

U.S. PATENT DOCUMENTS

| | | | | |
|---|---|---|---|---|
| 5,460,255 A * | 10/1995 | Quigley | ................... | F16D 13/74 |
| | | | | 192/70.14 |
| 9,022,183 B2 * | 5/2015 | Bill | ....................... | F16D 65/127 |
| | | | | 188/218 XL |
| 2003/0085094 A1 * | 5/2003 | Miyoshi | ................ | F16D 25/123 |
| | | | | 192/70.12 |
| 2004/0074731 A1 | 4/2004 | Miyoshi | | |
| 2010/0006388 A1 | 1/2010 | Fabricius et al. | | |
| 2014/0346003 A1 * | 11/2014 | Okamura | ................ | F16D 13/64 |
| | | | | 192/107 M |
| 2016/0281810 A1 * | 9/2016 | Terauchi | ................ | F16D 69/026 |
| 2018/0216673 A1 * | 8/2018 | Götz | ........................ | F16D 69/00 |
| 2022/0049745 A1 * | 2/2022 | Yagi | ........................ | F16D 13/74 |

FOREIGN PATENT DOCUMENTS

| | | | | |
|---|---|---|---|---|
| CN | 101517256 A | | 8/2009 | |
| CN | 106704401 A | | 5/2017 | |
| DE | 102012014804 A1 * | 1/2014 | ........... | F16D 13/648 |
| DE | 102012014811 A1 * | 1/2014 | ........... | F16D 13/648 |
| DE | 102015221230 A1 * | 5/2017 | | |
| DE | 102016222234 A1 * | 5/2018 | ........... | F16D 13/648 |
| JP | S60-045930 U1 | | 4/1985 | |
| JP | 2003-130084 A | | 5/2003 | |
| JP | 2009-030663 A | | 2/2009 | |
| JP | 2017-096366 A | | 6/2017 | |
| JP | 2017223290 A | * | 12/2017 | |
| JP | 2018-522176 A | | 8/2018 | |

* cited by examiner

Primary Examiner — Ernesto A Suarez
Assistant Examiner — Lillian T Nguyen
(74) Attorney, Agent, or Firm — Global IP Counselors, LLP

(57) ABSTRACT

A wet-type friction engaging device includes a first friction member and a second friction member defining a groove formed on a surface of a base facing the first friction member.

22 Claims, 10 Drawing Sheets

WET-TYPE FRICTION ENGAGING DEVICE

TECHNICAL FIELD

The present invention relates to a wet-type friction engaging device.

BACKGROUND ART

A wet-type friction engaging device of an automatic transmission provided in a vehicle comprises drive plates and driven plates arranged alternately in the rotation axis direction. The drive plates are fitted on the outer periphery of an inner diameter side rotor of the rotation axis, and the driven plates are fitted on the inner periphery of an outer diameter side rotor.

The wet-type friction engaging device comprises a piston that operates by hydraulic pressure, this piston presses the drive plates and the driven plates in the rotation axis direction, and by engaging the drive plates and the driven plates to not be able to rotate relatively, rotational force is transmitted between the inner diameter side rotor and the outer diameter side rotor.

A friction facing material is attached to the facing surfaces of the drive plates and the driven plates. By this friction facing material contacting the facing surface of the driven plates by pressing of the piston and frictional force being generated, the drive plates and the driven plates are engaged (see Japanese Unexamined Patent Publication No. 2017-96366, for example).

SUMMARY

When switching between engagement and release of the drive plates and the driven plates, the drive plates and the driven plates are temporarily in a slipping state, and generate heat. For that reason, oil having a friction adjustment function and a cooling function is supplied between the drive plates and the driven plates, and there is a demand to improve the coolability of the oil.

According to one aspect of the present invention, a wet-type friction engaging device includes a first friction member and a second friction member defining a groove formed on a surface of a base facing the first friction member friction engaging device.

According to one aspect of the present invention, coolability of the oil supplied between the first friction member and the second friction member is improved by the groove provided in the second friction member facing the first friction member.

DETAILED DESCRIPTION OF EMBODIMENTS

Figure 1:
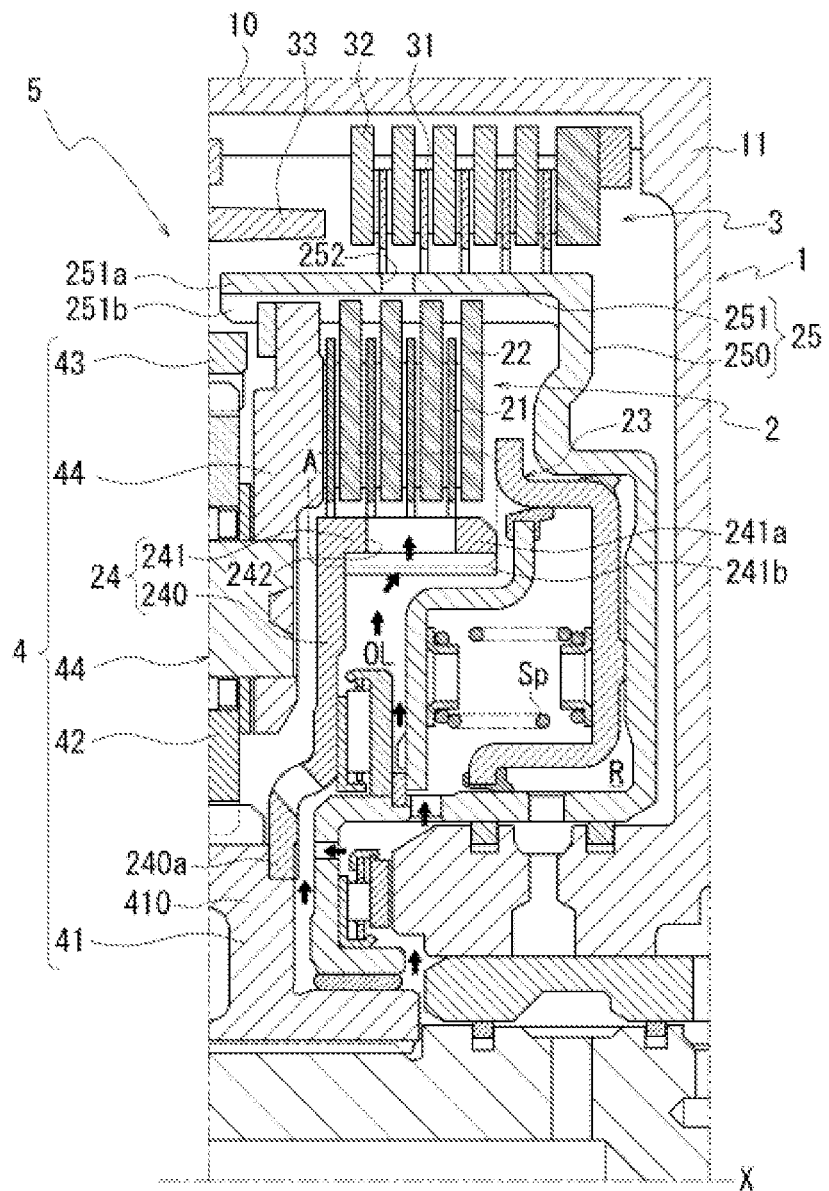
FIG. 1 is a drawing for explaining the configuration of a forward/reverse switching mechanism.

Following, the wet-type friction engaging device of an embodiment of the present invention is explained while referring to the drawings. With this embodiment, as an example of the wet-type friction engaging device, an example is explained of a forward clutch comprised by a forward/reverse switching mechanism of a vehicle.

FIG. 1 is a drawing showing the configuration of the forward/reverse switching mechanism.

Figure 2:
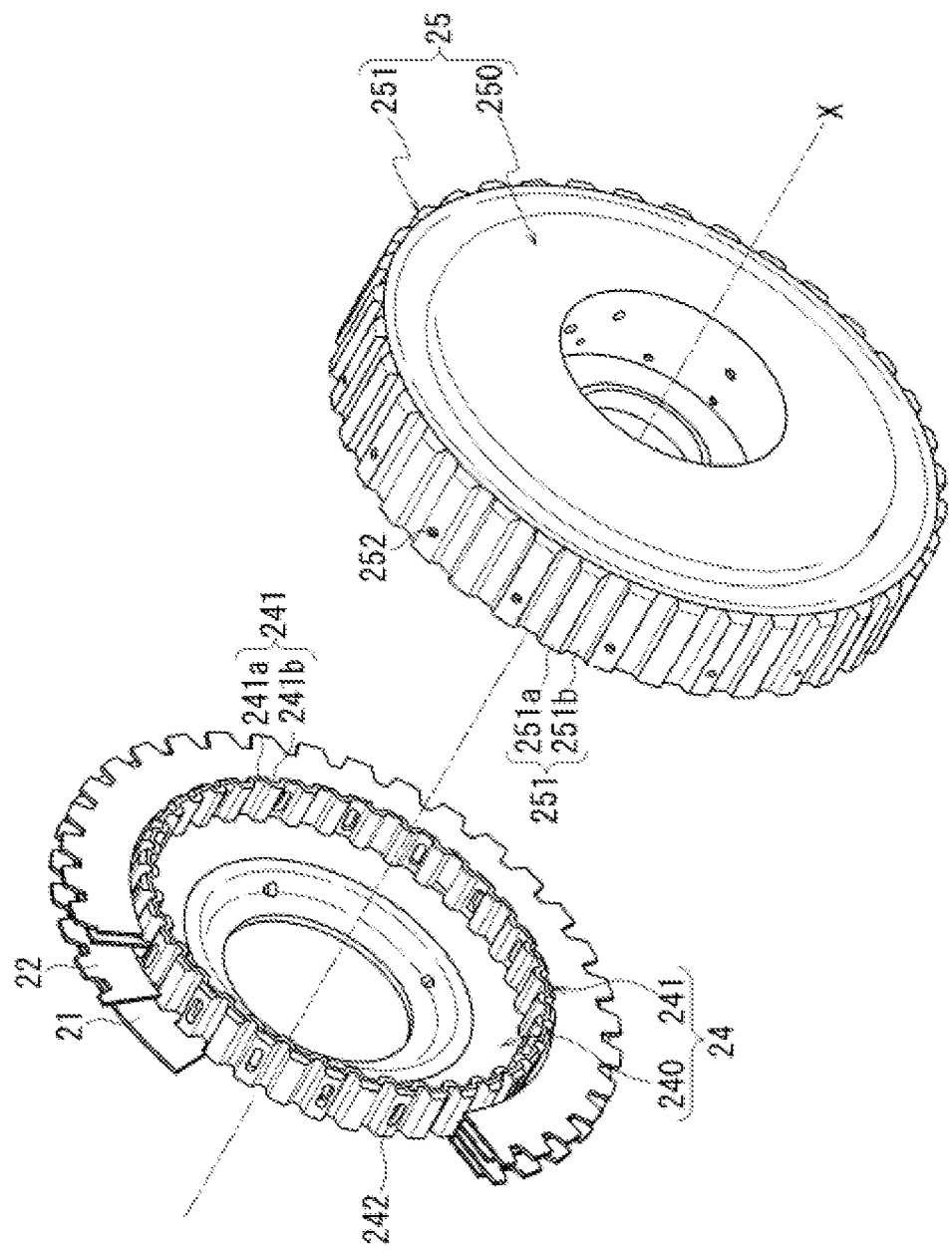
FIG. 2 is an exploded perspective view of a forward clutch.

FIG. 2 is an exploded perspective view of the forward clutch.

As shown in FIG. 1, a forward/reverse switching mechanism 5 comprises a forward clutch 2 that directly connects between a sun gear 41 and a carrier 44 of a planetary gear set 4, and a reverse brake 3 that fixes a clutch drum 25. The forward/reverse switching mechanism 5, during engagement of the forward clutch 2, outputs rotational drive force inputted from an engine (not illustrated) as is, and during engagement of the reverse brake 3, reverses the rotational drive force and outputs it.

In the interior of a transmission case 10, the forward clutch 2 and the reverse brake 3 are positioned between a front cover 11 of the transmission case 10 and the planetary gear set 4.

The reverse brake 3 is positioned on the outer diameter side of the forward clutch 2, and has ring-shaped driven plates 32 that are spline-fitted to the inner periphery of the transmission case 10, ring-shaped drive plates 31 that are spline-fitted to the outer periphery of the clutch drum 25, and a piston 33 that strokes in the axial direction of a rotation axis X (hereafter, the rotation axis X direction) by hydraulic pressure.

The clutch drum 25 has a cylindrical peripheral wall 251, and a bottom part 250 extending to the inner diameter side from one end of the peripheral wall 251, and in the cross section view, the clutch drum 25 has a bottomed cylindrical shape.

As shown in FIG. 2, seen from the rotation axis X direction, in the peripheral wall 251, spline peaks 251a and spline troughs 251b positioned at the outer diameter side are formed connected alternately in the circumferential direction around the rotation axis X, and the spline is formed along the rotation axis X direction at the inner periphery and the outer periphery of the peripheral wall 251.

As shown in FIG. 1, a plurality of drive plates 31 are provided spline-fitted to the outer periphery of the peripheral wall 251, and each of the drive plates 31 is provided to able to move in the rotation axis X direction in a state with relative rotation restricted with the peripheral wall 251 in the circumferential direction around the rotation axis X.

The driven plates 32 positioned radially outside the peripheral wall 251 are also provided to be able to move in the rotation axis X direction in a state with relative rotation restricted with the transmission case 10 in the circumferential direction around the rotation axis X.

The driven plates 32 and the drive plates 31 of the reverse brake 3 are arranged alternately in the rotation axis X direction, and also, seen from the rotation axis X direction, are arranged so that the outer diameter side of the drive plates 31 and the inner diameter side of the driven plates 32 overlap.

The overlapping parts of these drive plates 31 and driven plates 32 are made to be pressed in the rotation axis X direction by the piston 33 provided on the side opposite to the abovementioned front cover 11.

By supplying of operating hydraulic pressure to an oil chamber (not illustrated), this piston 33 is made to be displaced to the front cover 11 side and press the drive plates 31 and the driven plates 32.

With the reverse brake 3, relative rotation of the drive plates 31 and the driven plates 32 is made to be restricted according to the engagement state of the drive plates 31 and the driven plates 32 by pressing of the piston 33.

For that reason, when the drive plates 31 and the driven plates 32 are in a state engaged without being able to rotate relatively, since the driven plates 32 are spline-fitted to the inner periphery of the transmission case 10, the clutch drum 25 to which the drive plates 31 are spline-fitted is made to have rotation around the rotation axis X blocked.

The forward clutch 2 positioned at the inner diameter side of the reverse brake 3 has: driven plates 22 that are spline-fitted to the inner periphery of the peripheral wall 251 of the clutch drum 25; drive plates 21 that are spline-fitted to the outer periphery of a cylindrical peripheral wall 241 of a clutch hub 24; and a piston 23 that strokes in the rotation axis X direction by hydraulic pressure.

As shown in FIG. 1, the clutch hub 24 has the cylindrical peripheral wall 241, and a bottom part 240 extending to the inner diameter side from one end of the peripheral wall 241, and in the cross section view, the clutch hub 24 has a bottomed cylindrical shape.

Inside the transmission case 10, the clutch hub 24 and the clutch drum 25 are assembled from the rotation axis X direction oriented with their openings mutually facing, and in this state, the clutch 24 is housed on the inside of the peripheral wall 251 of the clutch drum 25 (see FIG. 1 and FIG. 2).

An end part 240a of the inner diameter side of the bottom part 240 of the clutch hub 24 is welded to a base 410 of the sun gear 41, and the sun gear 41 and the clutch hub 24 are linked to each other in a state in which relative rotation is restricted in the circumferential direction around the rotation axis X.

As shown in FIG. 2, seen from the rotation axis X direction, in the peripheral wall 241 of the clutch hub 24, spline peaks 241a and spline troughs 241b positioned at the outer diameter side are formed alternately connected in the circumferential direction around the rotation axis X, and the spline is formed along the rotation axis X direction on the inner periphery and the outer periphery of the peripheral wall 241.

A plurality of the drive plates 21 are provided spline-fitted to the outer periphery of the peripheral wall 241, and each of the drive plates 21 is provided to be able to move in the rotation axis X direction in a state with the relative rotation restricted with the peripheral wall 241 in the circumferential direction around the rotation axis X.

As shown in FIG. 1, the driven plates 22 positioned radially outside the peripheral wall 241 also are provided to be able to move in the rotation axis X direction in a state with relative rotation restricted with the clutch drum 25 in the circumferential direction around the rotation axis X.

The driven plates 22 and the drive plates 21 of the forward clutch 2 are arranged alternately in the rotation axis X direction, and seen from the rotation axis X direction, are arranged to have the outer diameter side of the drive plates 21 and the inner diameter side of the driven plates 22 overlap.

The parts at which these drive plates 21 and the driven plates 22 overlap are made to be pressed in the rotation axis X direction by the piston 23 provided on the abovementioned front cover 11 side (right side in the drawing).

This piston 23 is displaced in the rotation axis X direction by adjustment of operating hydraulic pressure supplied to an oil chamber R formed between it and the bottom part 250 of the clutch drum 25. When the piston 23 is displaced in the direction away from the front cover 11, the drive plates 21 and the driven plates 22 are pressed and engaged. When the piston 23 is displaced to the front cover 11 side, engagement of the drive plates 21 and the driven plates 22 is released.

With the forward clutch 2, the relative rotation of the drive plates 21 and the driven plates 22 is made to be restricted according to the engagement state by pressing of the drive plates 21 and the driven plates 22.

For that reason, when the drive plates 21 and the driven plates 22 are in a state engaged without being able to rotate relatively, the clutch drum 25 spline-fitted with the driven plates 22 is linked to the carrier 44 of the planetary gear 4, and the clutch hub 24 spline-fitted with the drive plates 21 is linked to the sun gear 41, so the sun gear 41 and the carrier 44 of the planetary gear set 4 are made to be linked to be able to rotate integrally.

With the peripheral wall 241 of the clutch hub 24, oil holes 242, for guiding to the outer diameter side of the peripheral wall 241 lubricating oil OL that is supplied from the inner diameter side of the transmission case 10 to the spline peaks 241a positioned at the outer diameter side, are formed penetrating the spline peaks 241a in the radial direction.

As shown in FIG. 2, with the peripheral wall 241 of the clutch hub 24, the spline peaks 241a in which the oil holes 242 are not provided are positioned at prescribed intervals in the circumferential direction around the rotation axis X.

On the peripheral wall 251 of the clutch drum 25 as well, oil holes 252 for guiding the lubricating oil OL to the outer diameter side of the peripheral wall 251 are formed penetrating the spline peaks 251a in the radial direction.

Next, explained is the detailed configuration of the drive plates 21 and the driven plates 22 of the forward clutch 2 which is the wet-type friction engaging device.

Figure 3:
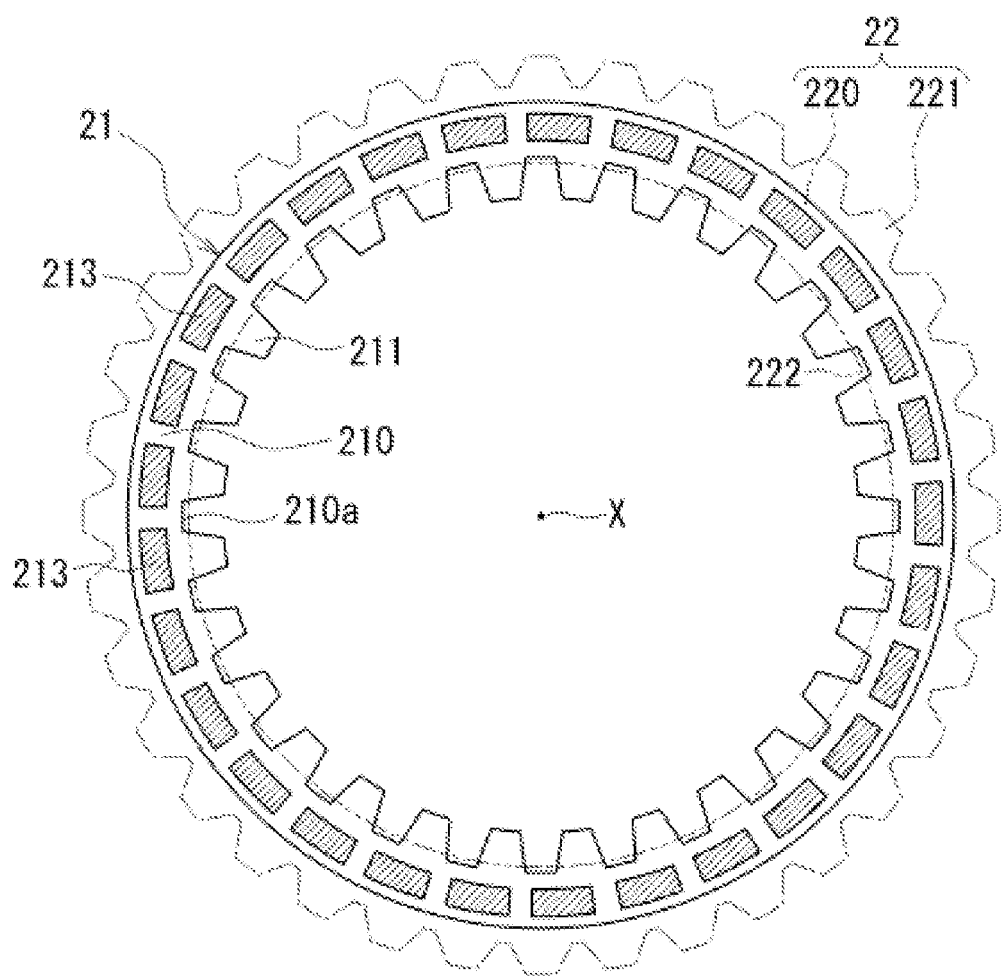
FIG. 3 is a drawing of a drive plate of the forward clutch seen from the rotation axis direction.

FIG. 3 is a drawing of the drive plate 21 of the forward clutch 2 seen from the rotation axis X direction.

Figure 4A:
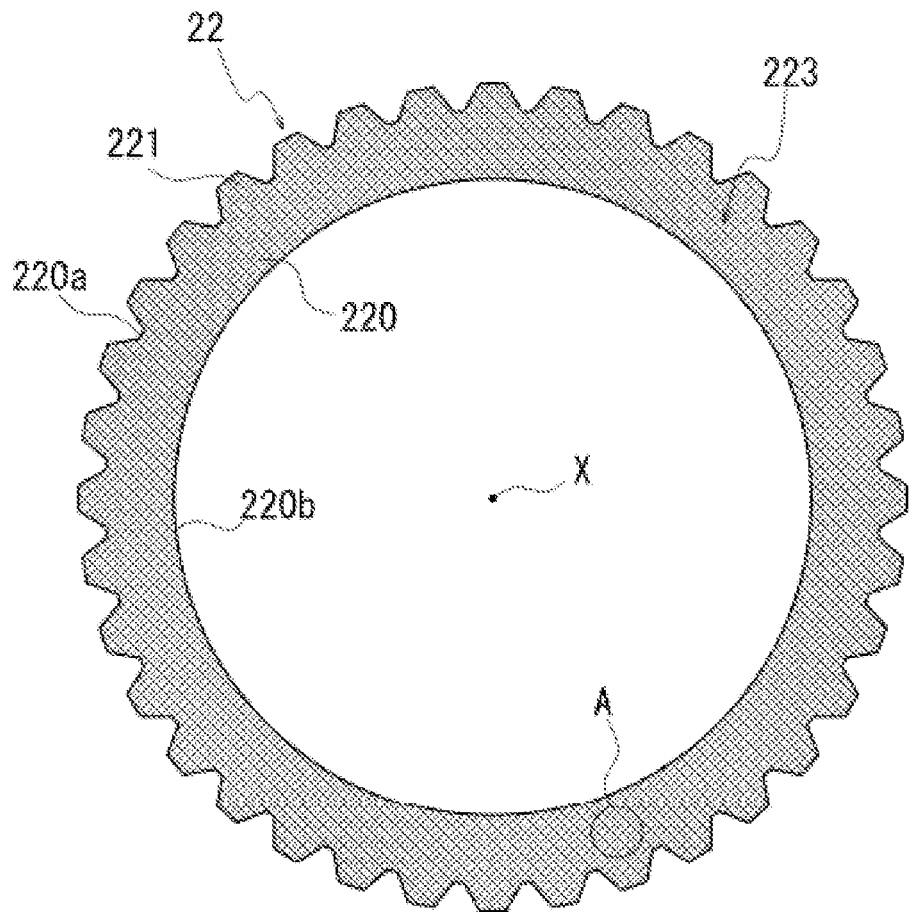
FIG. 4A is a drawing of a driven plate of the forward clutch seen from the rotation axis direction.
Figure 4B:
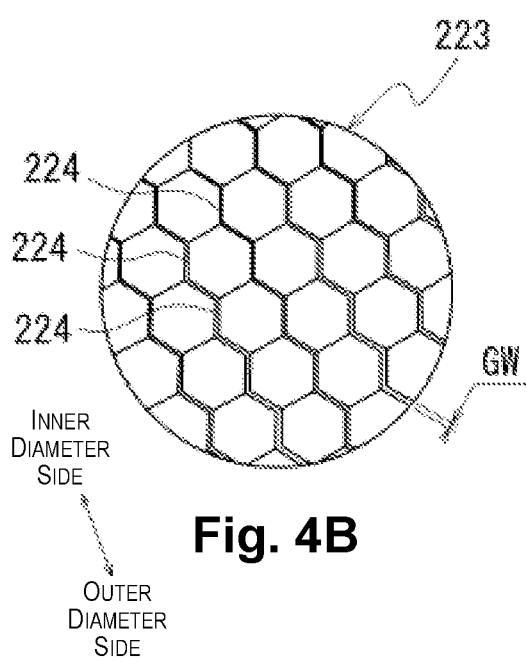
FIG. 4B is an example of an enlarged view of grooves.
Figure 4C:
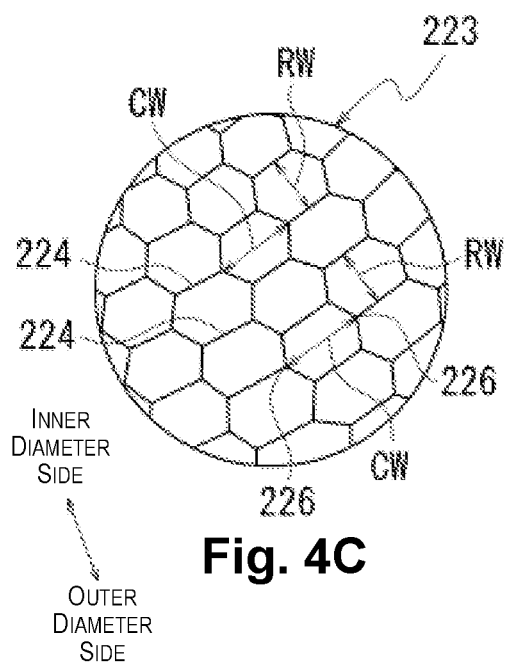
FIG. 4C is another example of an enlarged view of the grooves.

FIG. 4A is a drawing of the driven plate 22 of the forward clutch 2 seen from the rotation axis X direction. FIG. 4B is an example of an enlarged drawing of a groove. FIG. 4C is another example of an enlarged view of the groove.

Figure 5:
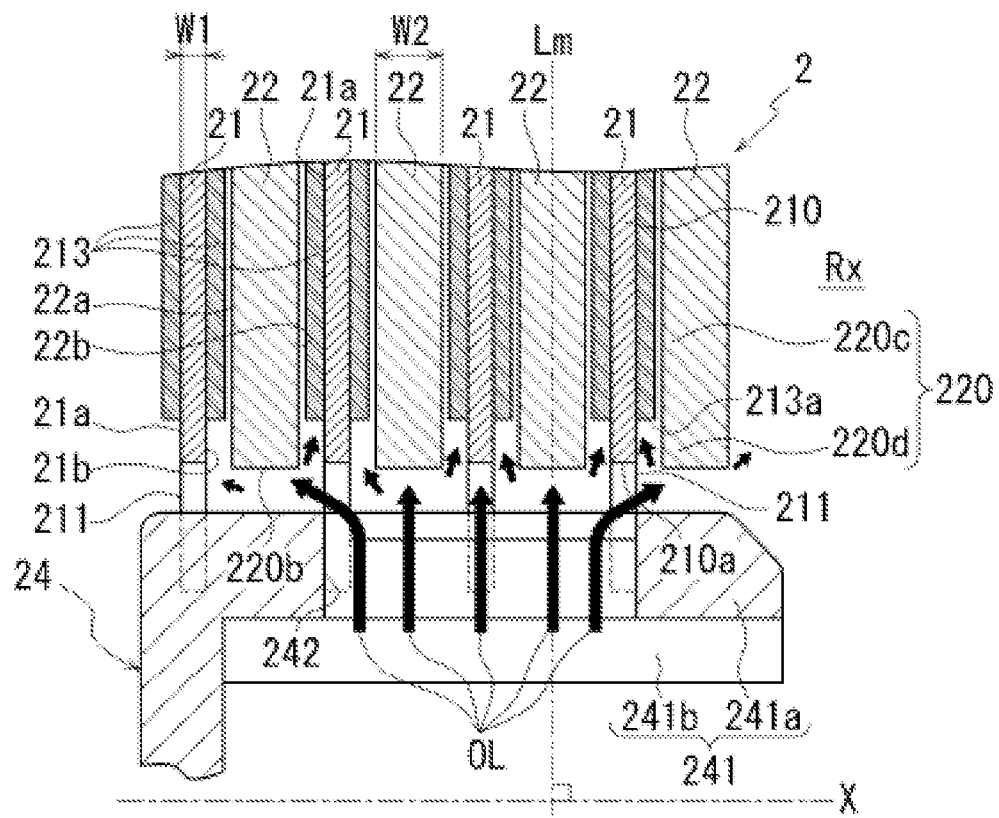
FIG. 5 is an enlarged view of region A of FIG. 1.

FIG. 5 is an enlarged view of region A of FIG. 1.

With FIG. 3, to explain the positional relationship between the drive plates 21 and the driven plates 22 arranged alternately in the rotation axis X direction, the driven plate 22 arranged adjacent to the drive plate 21 in the rotation axis X direction is shown by a virtual line.

As shown in FIG. 3, the drive plate 21 has a base 210 provided on the outer diameter side with respect to the rotation axis X, and teeth 211 provided on the inner diameter side. The driven plate 22 has a base 220 provided on the inner diameter side with respect to the rotation axis X, and teeth 221 provided on the outer diameter side. The base 210 of the drive plate 21 and the base 220 of the driven plate 22 are overlapped when seen from the rotation axis X direction.

The base 210 of the drive plate 21 has a ring shape when seen from the rotation axis X direction, and along an inner peripheral edge 210a of this base 210, a plurality of the teeth 211 are provided at prescribed intervals along the entire circumference of the circumferential direction around the rotation axis X. The teeth 211 are spline-fitted to the outer periphery of the peripheral wall 241 of the abovementioned clutch hub 24 (see FIG. 2).

Facing materials 213 are fixed to the base 210 of the drive plate 21. The facing materials 213 are friction material constituted from fiber, etc., impregnated with synthetic resin, etc., for example.

The facing materials 213 form an arc shape along the circumferential direction around the rotation axis X, and a plurality are arranged at equal intervals in the circumferential direction around the rotation axis X. Also, the facing materials 213 are arranged positioned offset to the outer diameter side from the inner peripheral edge 210a of the base 210.

As shown in FIG. 5, the facing materials 213 are each fixed to one surface 21a and another surface 21b in the rotation axis X direction of the drive plate 21.

As shown in FIG. 4A, the base 220 of the driven plate 22 has a ring shape when seen from the rotation axis X direction, and along an outer peripheral edge 220a of the base 220, a plurality of teeth 221 are provided at prescribed intervals on the entire circumference in the circumferential direction around the rotation axis X. The teeth 221 are spline-fitted to the inner periphery of the peripheral wall 251 of the abovementioned clutch drum 25 (see FIG. 1).

As shown in FIG. 5, with the forward clutch 2, when seen from the radial direction, a plurality of the drive plates 21 and the driven plates 22 are arranged alternately in the rotation axis X direction, and each of the drive plates 21 and the driven plates 22 are arranged facing in the rotation axis X direction.

In specific terms, one surface 22a in the rotation axis X direction of the driven plate 22 faces another surface 21b of the drive plate 21. Also, in the base 220 of the one surface 22a, this faces the facing material 213 fixed to the other surface 21b.

Another surface 22b in the rotation axis X direction of the driven plate 22 faces the one surface 21a of the drive plate 21. Also, in the base 220 of the other surface 22b, this faces the facing material 213 fixed to the one surface 21a.

An inner peripheral edge 220b of the base 220 of the driven plate 22 is arranged at approximately the same position in the rotation axis X direction as an inner peripheral edge 201a of the base 210 of the drive plate 21. An inner peripheral edge 213a of the facing material 213 fixed to the base 210 of the drive plate 21 is arranged offset to the outer diameter side with respect to the inner peripheral edge 220b of the base 220 of the driven plate 22.

Specifically, in the base 220 of the driven plate 22, an opposing part 220c to the facing material 213 is provided at a position offset to the outer diameter side from the inner peripheral edge 220b of the base 220, and with an inner diameter part 220d between the opposing part 220c and the inner peripheral edge 220b of the base 220, faces the base 210 of the drive plate 21 without the facing material 213 being caught between.

In the explanation hereafter, the one surface 21a and the other surface 21b in the rotation axis X direction of the drive plate 21 are also simply called "surface 21a" and "surface 21b." The one surface 22a and the other surface 22b in the rotation axis X direction of the driven plate 22 are also simply called "surface 22a" and "surface 22b."

With FIG. 4A, shown schematically by cross hatching, a groove 223 is formed on the driven plate 22. The groove 223 is formed on the entire surface including the base 220 and the teeth 221 of the surfaces 22a, 22b of the driven plate 22 (see FIG. 5).

FIG. 4B and FIG. 4C show a portion of the groove 223 of region A of FIG. 4A enlarged, but the groove 223 is constituted from fine hexagonal grooves 224 formed continuously across the entire surface of each of the surfaces 22a, 22b of the driven plate 22.

The hexagonal grooves 224 can be formed using a known method such as laser processing or press processing. The hexagonal grooves 224 are formed on the ring-shaped driven plate 22, so for example, with laser processing, as shown in FIG. 4B, it is also possible to have the groove width GW of the hexagonal groove 224 gradually broaden as it faces the outer diameter side from the inner diameter side of the rotation axis X.

Meanwhile, for example with press processing, as shown in FIG. 4C, it is also possible to have the groove width of the hexagonal groove 224 be fixed, and to adjust the size of the hexagon. The size of the hexagon means the surface area of the flat part surrounded by the hexagonal groove 224. In specific terms, the size of the hexagon can be adjusted to be greater as it faces the outer diameter side from the inner diameter side of the rotation axis X. At that time, it is also possible to increase the size of the hexagon by having the radial direction width RW of the hexagon be fixed, and to have the circumferential direction width CW of the flat part become bigger as it faces the outer diameter side from the inner diameter side.

Figure 6A:
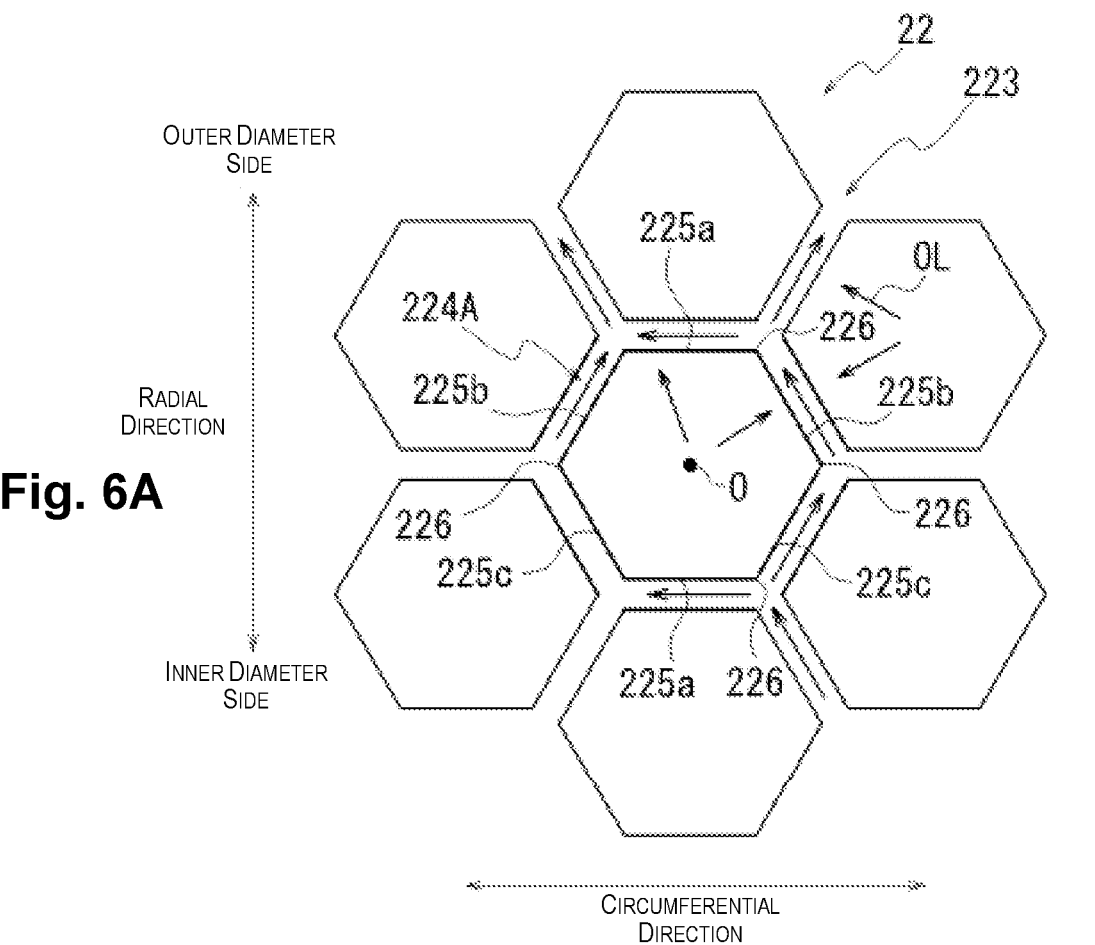
FIGS. 6A, 6B and 6C are drawings showing the details of the grooves.
Figure 6B:
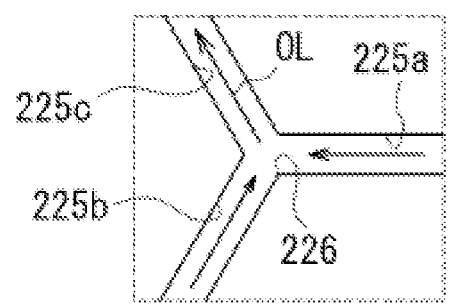
Figure 6C:
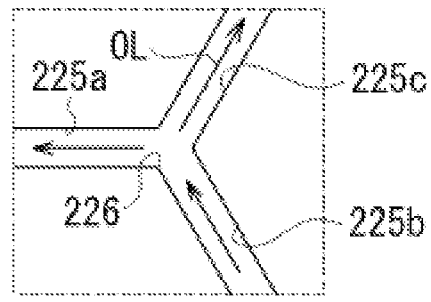

FIG. 6 is a drawing showing details of the groove 223. FIG. 6A is an enlarged view of the hexagonal groove 224 formed on the groove 223, and FIG. 6B is a drawing showing branching of a circumferential groove 225a at a corner 226. FIG. 6C is a drawing showing branching of a radial groove 225b at the corner 226. In FIG. 6, the "circumferential direction" and "radial direction" means the circumferential direction and radial direction around the rotation axis X (see FIG. 4).

The hexagonal grooves 224 that constitute the groove 223, as shown in FIG. 4B and FIG. 4C, may also have the size change facing the outer diameter side from the inner diameter side, but each hexagonal groove 224 comprises the same structure. Here, using as an example the hexagonal groove 224A illustrated by bold lines at the center of FIG. 6A, the structure is explained. The hexagonal groove 224A is configured from six grooves 225a to 225c connected at the six corners 226. The six grooves 225a to 225c have the same length, and the distance from a center O of the hexagonal groove 224A to the six corners 226 is an equal distance. The center O is the intersection point of diagonal lines connecting each corner 226, and is positioned on the top surface of surface 22a and surface 22b of the driven plate 22. With FIG. 6A, the hexagonal groove 224A is shown as a regular hexagon, but it is not strictly necessary to be a regular hexagon, and dimensional errors are tolerated. Also, as shown in FIGS. 4B and 4C, when the size is adjusted facing from the inner diameter side to the outer diameter side, it is possible to include both regular hexagons and items that are not regular hexagons.

The hexagonal groove 224A extends along the circumferential direction of the rotation axis X, and comprises a pair of circumferential grooves 225a, 225a adjacent in the radial direction of the rotation axis X. The end part of one side (left side in the drawing) and the end part of the other side (right side in the drawing) of the pair of circumferential grooves 225a, 225a are each connected by radial grooves 225b, 225b extending in zigzag form with respect to line segments parallel to the radial direction.

In this way, the hexagonal groove 224A forms one groove for which grooves extending in different directions are joined by having end parts of the circumferential grooves 225a, 225a and the radial grooves 225b, 225c connected to each other.

The hexagonal groove 224A is adjacent to six other hexagonal grooves 224 in the radial direction and the circumferential direction, but in the radial direction, there is a shared circumferential groove 225a with the hexagonal grooves 224 adjacent in the radial direction, and sharing of either of the radial groove 225b, 225c with the hexagonal grooves 224 adjacent in the circumferential direction.

Also, the hexagonal groove 224A shares two hexagonal grooves 224 and the corner 226 adjacent in the radial direction or the circumferential direction. As a result, all the grooves constituting the hexagonal groove 224 are made to branch and join with other grooves at the corners 226.

For example, as shown in FIG. 6B, the circumferential groove 225a branches to radial grooves 225b, 225c at the corner 226. As shown in FIG. 6C, the radial groove 225b branches to the radial groove 225c and the circumferential groove 225a when it reaches the corner 226. Though omitted in the drawing, the radial groove 225c branches to the radial groove 225b and the circumferential groove 225a when it reaches the corner 226.

Though the dimensions of each hexagonal groove 224 are not limited, for example, it is possible to have the respective length of the circumferential grooves 225a and radial grooves 225b, 225c be 120 μm, and to have the groove depth be 20 μm, and the groove width be 50 μm.

In this way, by the plurality of hexagonal grooves 224 mutually having the grooves 225a to 225c and corner 226 formed continuously along the entire surface of the surfaces 22a, 22b of the driven plate 22 as shown in FIG. 4A, grooves extending in the radial direction and the circumferential direction on the driven plate 22 are in an evenly stretched state.

As noted above, in the forward clutch 2, by the piston 23 shown in FIG. 1 pressing the drive plates 21 and the driven plates 22 from the rotation axis X direction, the drive plates 21 and the driven plates 22 are in contact, and are engaged by the generated frictional force.

In specific terms, the facing materials 213 fixed to the surfaces 21a, 21b of the drive plate 21 (see FIG. 5) are pressure-welded to both surfaces 22b, 22a of the driven plate 22, and due to friction, the drive plate 21 and the driven plate 22 go through a slipping state and are engaged without the ability to rotate relatively.

By the piston 23 being displaced in the direction away from the drive plates 21 and the driven plates 22, the drive plates 21 and the driven plates 22 are in a released state.

Here, when switching between the engaged state and the released state of the drive plates 21 and the driven plates 22, the drive plates 21 and the driven plates 22 are temporarily in a slipping state, and heat generation occurs.

A structure for supplying the lubricating oil OL is provided in the forward clutch 2. The lubricating oil OL is supplied for friction adjustment and cooling of the drive plates 21 and the driven plates 22. As shown in FIG. 5, with the clutch hub 24 of the forward clutch 2, the drive plates 21 are spline-fitted to the outer periphery of the peripheral wall 241, and with the peripheral wall 241 of this clutch hub 24, oil holes 242 are provided that penetrate the spline peaks 241a in the radial direction of the rotation axis X.

By centrifugal force due to rotation of the clutch hub 24, the lubricating oil OL reaches the inner periphery of the peripheral wall 241 from the inner diameter side of the rotation axis X, and is supplied through the oil holes 242 to a region Rx in which are positioned the drive plates 21 and the driven plates 22 of the outer diameter side of the peripheral wall 241.

The lubricating oil OL supplied to the region Rx bumps into the inner peripheral edge 220b of the base 220 of the driven plate 22, branches to the surface 22a side and the surface 22b side, and flows to the opposing part 220c from the inner diameter part 220d of the base 220. The lubricating oil OL is supplied to the facing materials 213 facing the opposing part 220c, and cools the facing materials 213.

Here, as noted above, the opposing part 220c is provided at a position offset to the outer diameter side from the inner peripheral edge 220b of the base 220, and with the inner diameter part 220d, the facing materials 213 are not pinched between, so the lubricating oil OL flows easily to the opposing part 220c of the outer diameter side, and is easily supplied to the facing materials 213.

The lubricating oil OL ultimately reaches the outer diameter side of the drive plates 21 and the driven plates 22, and from the oil holes 252 of the peripheral wall 251 (see FIG. 1) in which the driven plates 22 are spline-fitted to the inner periphery, is supplied to the reverse brake 3 positioned radially outside (see FIG. 1).

Here, when the drive plates 21 and the driven plates 22 are engaged, by the facing materials 213 being pressure-welded, the surface pressure received by surfaces 22a, 22b of the driven plates 22 becomes high, and heat may be generated.

The lubricating oil OL supplied to surfaces 22a, 22b of the driven plates 22 easily generates a polymer due to heat damage, and the generated polymer, etc., blocks the pores of the facing materials 213. By the pores of the facing materials 213 being blocked, the lubricating oil OL that has no place to go exists in excess between the drive plates 21 and the driven plates 22. By operation of the force trying to push back the facing materials 213 by the excessive lubricating oil OL, a phenomenon similar to hydroplaning occurs, and this can lead to judder.

It is also possible that the generated heat will affect the durability of the wet-type friction engaging device.

Figure 7:
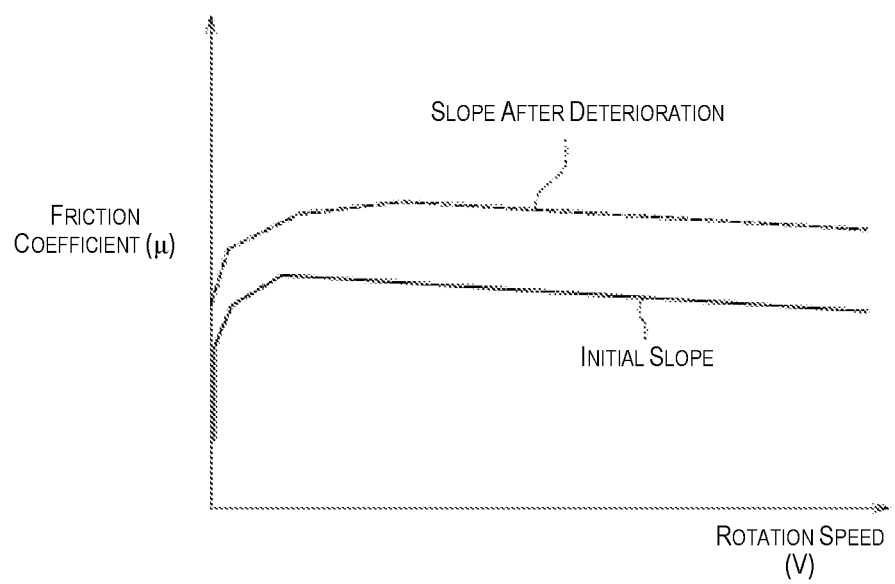
FIG. 7 is a graph showing the μV characteristics of the driven plate.

FIG. 7 is a graph showing the μV characteristics of the driven plates 22.

The μV characteristics show the frictional coefficient (μ) between the driven plates 22 and the facing materials 213 according to the relative velocity (V) between the driven plates 22 and the facing materials 213. In FIG. 7, the solid line shows the initial slope of the μV characteristics, and the dotted line shows the slope after deterioration.

As can be understood from the graph in FIG. 7, the wet-type friction engaging device deteriorates over time, and this deterioration over time is promoted by a temperature rise due to generated heat. Here, by applying the configuration of the embodiment, the temperature rise is mitigated, so it is possible to ease the deterioration speed, and to improve the durability of the wet-type friction engaging device.

With the embodiment, as shown in FIG. 4, the groove 223 is formed along the entirety of the surfaces 22a, 22b of the driven plate 22.

For that reason, when the facing materials 213 are pressure-welded to the surfaces 22a, 22b of the driven plate 22, as shown by the arrow in FIG. 6A, the lubricating oil OL adhered to the surface of the driven plate 22 enters into the groove 223 from the surface. As a result, the lubricating oil OL does not exist excessively between the drive plates 21 and the driven plates 22.

Furthermore, the groove 223 is configured from hexagonal grooves 224 formed continuously on the surfaces 22*a*, 22*b* of the driven plate 22, and by each hexagonal groove 224 sharing the circumferential groove 225*a* and one of the radial groove 225*b*, 225*c* with the other hexagonal grooves 224, the overall groove 223 is joined in the radial direction and the circumferential direction of the driven plate 22.

As a result, the lubricating oil OL entered in the groove 223 flows facing the outer diameter side from the inner diameter side of the rotation axis X by the centrifugal force due to rotation of the clutch hub 24, and is easily exhausted to the reverse brake 3 (see FIG. 1) positioned radially outside the forward clutch 2.

The lubricating oil OL flows toward the outer diameter side from the inner diameter side of the rotation axis X by the centrifugal force due to rotation of the clutch hub 24, and also flows in the circumferential direction. The hexagonal grooves 224 have the circumferential grooves 225*a* formed along the circumferential direction, so the lubricating oil OL flowing in the circumferential direction is trapped in the circumferential groove 225*a*, and also passes through the radial groove 225*b* or 225*c* joined to the circumferential groove 225*a*, so easily flows to the outer diameter side of the driven plate 22.

Also, the circumferential groove 225*a* and the radial grooves 225*b*, 225*c* constituting the hexagonal groove 224 are joined with other grooves at the corners 226. For example, as shown in FIG. 6B, when the lubricating oil OL flowing in the circumferential groove 225*a* and the radial groove 225*b* reaches the corner 226, it flows to the radial groove 225*c* of the outer diameter side. As shown in FIG. 6C, when the lubricating oil OL flowing in the radial groove 225*b* reaches the corner 226, it flows to the circumferential groove 225*a* and the radial groove 225*c* in a form of squeezing past the corner 226. In this way, the lubricating oil OL flowing in each groove flows together at the corners 226, and by squeezing past the corners 226 and branching, the flowability of the lubricating oil OL increases.

Immediately after operation start of a vehicle, etc., because the lubrication oil OL is at a low temperature, it tends to have poor flowability, but since flowability increases in the hexagonal grooves 224 in this way, it is less likely for there to be excessive lubricating oil OL between the drive plates 21 and the driven plates 22.

Also, as shown in FIG. 4A, the groove 223 is formed on the entire surface of surfaces 22*a*, 22*b* of the driven plate 22, and is formed continuously not only on the opposing part 220*c* of the base 220 facing the facing material 213, but also on the outer diameter side of the opposing part 220*c* including the teeth 221. As a result, it is easier for the lubricating oil OL supplied to the opposing part 220*c* to be exhausted to the outer diameter side, and easier to be supplied to the reverse brake 3 at the outer diameter side of the forward clutch 2.

As shown in FIG. 4B, when the hexagonal grooves 224 are formed to have the groove width GW widen facing the outer diameter side from the inner diameter side of the rotation axis X, the hexagonal grooves 224 formed on the teeth 221 have a wider width than the hexagonal grooves 224 formed on the base 220, and the lubricating oil OL is exhausted more easily.

As shown in FIG. 4C, in the size adjustment of the hexagon, when the radial direction width RW is fixed, and the circumferential direction width CW is adjusted to be greater facing the outer diameter side from the inner diameter side, the corner 226 of the circumferential direction does not broaden even at the outer diameter side. For that reason, when the drive plates 21 and the driven plates 22 are engaged, it is possible to keep the effect of the corner 226 of the circumferential direction separating and exhausting the lubricating oil OL at the outer diameter side as well.

Also, as shown in FIG. 5, the lubricating oil OL flows to the opposing part 220*c* facing the facing material 213 from the inner diameter part 220*d* of the driven plate 22, but the groove 223 is formed continuously from this inner diameter part 220*d* to the opposing part 220*c*. For that reason, the lubricating oil OL entered into the groove 223 of the inner diameter part 220*d* easily flows to the opposing part 220*c* of the outer diameter side, and the lubricating oil OL is easily supplied to the facing material 213 of the opposing part 220*c*.

As described above, the forward clutch 2 (wet-type friction engaging device) of the embodiment has (1) the drive plates 21 (first friction member), and the driven plates 22 (second friction member), and in the driven plate 22, there is the groove 223 formed on the surfaces 22*a*, 22*b* (top surfaces) of the base 220 facing the drive plate 21.

Using this groove 223, the coolability is improved for the lubricating oil OL supplied between the drive plates 21 (first friction member) and the driven plates 22 (second friction member).

As an example, in the forward clutch 2, by the piston 23 pressing the drive plates 21 and the driven plates 22, friction is generated, the drive plates 21 and the driven plates 22 are engaged, and rotational drive force is transmitted.

When there is excessive lubricating oil OL between the drive plates 21 and the driven plates 22, a phenomenon similar to hydroplaning occurs, and this can lead to judder.

Also, when the facing materials 213 are provided on the drive plates 21, when the surface pressure between the facing materials 213 and the facing surfaces 22*a*, 22*b* of the driven plates 22 becomes high, heat is generated, and it is easier for the lubricating oil OL to generate polymer due to heat damage. Polymer, etc., blocks the pores of the facing material 213. Or, when the facing material 213 is in a brand new state, the porosity of the facing material 213 may be insufficient, and the pores may be insufficient.

The lubricating oil OL for which the pores are blocked, or having no place to go because there is insufficient porosity, exists excessively between the drive plates 21 and the driven plates 22, and by operation of the force trying to push back the facing material 213, a phenomenon similar to hydroplaning occurs, which can lead to judder.

With the embodiment, because the groove 223 is formed on the surface of the base 220 of the driven plate 22, by the lubricating oil OL that exists between the driven plates 22 and the drive plates 21 entering the groove 223, there is improvement in the oil drainage even in a state with relative rotation. As a result, there is no excessive lubricating oil OL between the drive plates 21 and the driven plates 22, and since it is possible to suppress the phenomenon similar to hydroplaning, it is possible to suppress judder.

Also, by the lubricating oil OL flowing to the groove 223 formed on the surface of the base 220 of the driven plate 22, it is possible to suppress heat generation of the driven plate 22, and since it is possible to suppress the generation of polymer due to heat damage at the root, it is possible to suppress polymer from blocking the pores of the facing material 213. By the pores of the facing material 213 not being susceptible to being blocked, it is less likely for there to be excessive lubricating oil OL between the drive plates 21 and the driven plates 22, and possible to suppress the force that tries to push back the facing material 213.

In this way, since it is possible to increase the coolability of the friction surface and the oil drainage of the friction parts using the groove 223 formed on the surface of the base 220 of the driven plate 22, it is possible to suppress causes of judder, and it is possible to improve the durability of the drive plates 21 and the driven plates 22.

With the embodiment noted above, the groove 223 was formed on the entire one surface 22a and the other surface 22b of the driven plate 22, but the invention is not limited to this, and for example, it is also possible to form the groove 223 only on the base 220 of the driven plate 22 facing the base 210 of the drive plate 21.

Also, with the embodiment, an example was explained in which the first friction member corresponds to the drive plate 21, and the second friction member corresponds to the driven plate 22, but conversely, it is also possible for the first friction member to be the driven plate 22, and the second friction member to be the driven plate 21. In this case, it is also possible to provide the facing material on the driven plate 22 side, and to provide the groove on the drive plate 21 side.

(2) The base 220 is provided on the inner diameter side of the driven plate 22, and the groove 223 that joins with the groove 223 formed on the surface of the base 220 is provided on the surface of the outer diameter side of the driven plate 22.

By the groove 223 being formed continuously also on the teeth 221 of the outer diameter side of the base 220, it is easier for the lubricating oil OL to be exhausted to the outer diameter side by centrifugal force.

(3) The groove 223 formed on the surface of the outer diameter side has a width wider than the groove 223 formed on the surface of the base 220.

By the groove width GW of the groove 223 provided on the teeth 221 of the outer diameter side being made wider than the groove 223 of the base 220 of the inner diameter side, it is easier for the lubricating oil OL to be exhausted to the outer diameter side.

(4) The facing material 213 (friction facing material) is provided on the surface of the drive plate 21, the opposing part 220c with the facing material 213 is provided on the outer diameter side in the base 220 of the driven plate 22, and the groove 223 is formed continuously on the outer diameter side from the inner diameter side of the base 220.

When the drive plates 21 and the driven plates 22 are engaged, in the opposing part 220c of the outer diameter side in the base 220, the driven plate 22 is pressure-welded with the facing material 213 fixed to the base 210 of the drive plate 21. The surface pressure between the facing material 213 and the driven plate 22 becomes high, making it easy for heat to be generated. By the groove 223 being formed continuously on the opposing part 220c from the inner diameter part 220d of the base 220 of the driven plate 22, it is easier for the lubricating oil OL supplied from the inner diameter part 220d to be supplied to the opposing part 220c, and easier for the facing material 213 to be cooled.

(5) The groove 223 is formed from a plurality of the hexagonal grooves 224 which are polygonal grooves having corners 226.

The lubricating oil OL flows in the radial direction to the outer diameter side from the inner diameter side of the driven plate 22 by receiving centrifugal force due to rotation of the clutch hub 24, but because the driven plate 22 is rotating, it also flows in the circumferential direction due to the centrifugal force. By using the hexagonal grooves 224 which are polygonal for the groove 223, it is possible to provide grooves extending in different directions, and easier to trap the lubricating oil OL flowing in the radial direction and the circumferential direction. Also, by using the hexagonal groove 224, it is easier to have the lubricating oil OL flow into the grooves evenly at each corner 226, and possible to improve oil drainage.

With the embodiment, an example was given of the hexagonal groove 224 as a polygonal groove, but the invention is not limited to this. It is also possible to use another polygon such as a triangle, a rectangle, etc.

(6) The hexagonal groove 224 is formed continuously on the surface of the base 220 of the driven plate 22, and the corners 226 of each hexagonal groove 224 are shared with corners 226 of other adjacent hexagonal grooves 224.

By having the hexagonal groove 224 formed continuously on the one surface 22a and the other surface 22b of the driven plate 22, it is possible to increase the surface area in which the lubricating oil OL enters. Because the lubricating oil OL flows through the hexagonal groove 224 formed continuously to the outer diameter side from the inner diameter side of the driven plate 22, it is easier for the lubricating oil OL to be exhausted to the reverse brake 3.

Furthermore, when the lubricating oil OL entered into each groove constituting the hexagonal groove 224 reaches the corners 226, it squeezes past the corners 226 and branches to other grooves, and by flowing together at the corners 226, the flowability of the lubricating oil OL increases. At the operating start time of the transmission, the lubricating oil OL is a low temperature so it is easy for flowability to be low, but by providing the corners 226, it is possible to increase flowability even at the start of operation.

Also, to form the hexagonal grooves 224 continuously on the surface of the base 220, for example, the hexagon shape of the hexagonal grooves 224 has the surface area of the outer diameter side be made larger than the inner diameter side of the driven plate 22. In specific terms, the hexagon shape is made to be gradually larger as it faces the outer diameter side from the inner diameter side.

(7) The hexagon shape of the hexagonal groove 224 can be made to have the circumferential direction width CW around the rotation axis X become wider as it faces the outer diameter side from the inner diameter side.

As a result, the corner 226 in the circumferential direction of the hexagonal groove 224 does not get wider even in the outer diameter side, so when the drive plates 21 and the driven plates 22 are engaged, it is possible to keep the effect of the corner 226 separating and exhausting the lubricating oil OL.

(8) With the embodiment, as the polygonal groove, the hexagonal groove 224 is adapted.

By using the hexagonal groove 224, it is possible to arrange grooves extending in different directions without gaps on the one surface 22a and the other surface 22b of the driven plate 22, so the lubricating oil OL easily enters the grooves, and also, it is easier for the lubricating oil OL that entered the grooves to be exhausted to the reverse brake 3.

(9) The hexagonal groove 224 is constituted from a pair of circumferential grooves 225a, 225a extending in the circumferential direction around the rotation axis X, and adjacent in the radial direction of the rotation axis X, and a plurality of radial grooves 225b, 225c that connect the facing end parts of the pair of circumferential grooves 225a, 225a to each other in the radial direction.

By comprising the circumferential grooves 225a, entering is easier for the lubricating oil OL that moves in the circumferential direction by receiving centrifugal force due to rotation of the drive plates 21 and the driven plates 22, and by the circumferential grooves 225*a* being connected with the radial grooves 225*b*, 225*c*, the lubricating oil OL trapped by the circumferential grooves 225*a* passes through the radial grooves 225*b*, 225*c* and flows to the outer diameter side, and is more easily exhausted from the driven plates 22.

(10) The groove 223 formed on the surface of the base 220 of the driven plate 22 is formed on the entire surface of the base 220.

By having the groove 223 be formed on the entire surface of the base 220, it is possible to do processing more easily than when formed locally.

Modification Example 1

Figure 8:
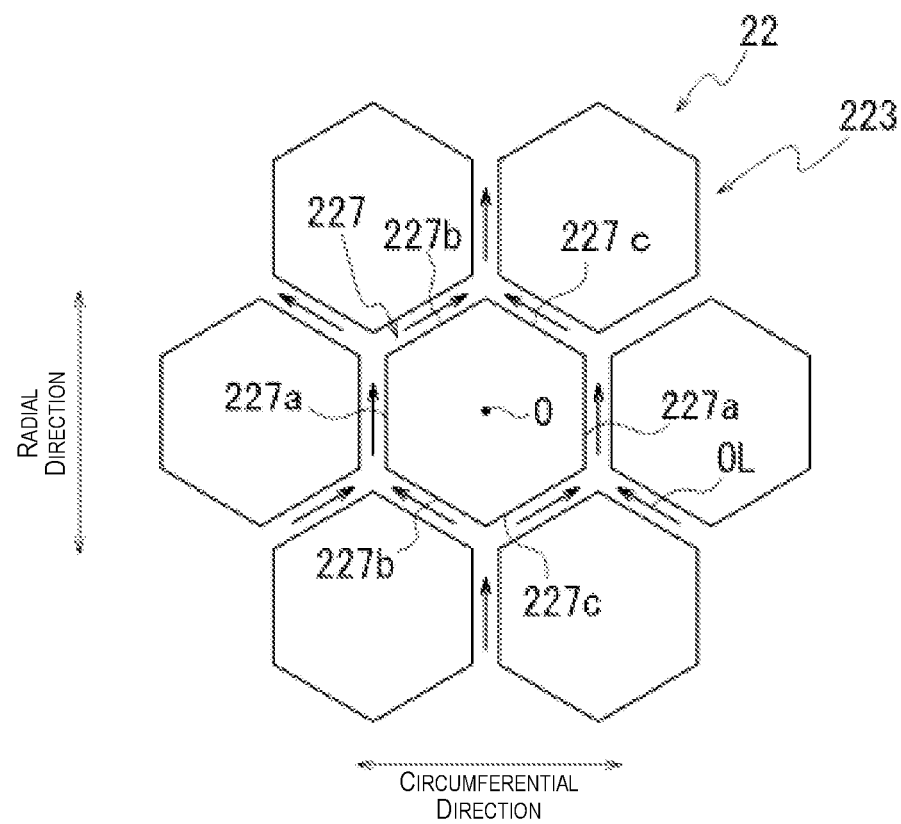
FIG. 8 is a drawing for explaining the configuration of the grooves of Modification Example 1.

FIG. 8 is a drawing for explaining the configuration of the groove 223 of Modification Example 1.

The hexagonal groove 224 explained with the embodiment was explained as having circumferential grooves 225*a* along the circumferential direction (see FIG. 6), but the invention is not limited to this.

As shown in FIG. 8, a hexagonal groove 227 of Modification Example 1 is an item for which the hexagonal groove 224 of the embodiment is arranged with the orientation changed.

The hexagonal groove 227 comprises a pair of radial grooves 227*a*, 227*a* extending along the radial direction of the rotation axis X and adjacent in the radial direction of the rotation axis X. The pair of radial grooves 227*a*, 227*a* are connected by circumferential grooves 227*b*, 227*c* extending in zigzag form with respect to the line segments parallel in the circumferential direction.

By having grooves extending in different directions, the hexagonal groove 227 of Modification Example 1 also more easily traps the lubricating oil OL flowing in the radial direction and the circumferential direction.

Modification Example 2

Figure 9:
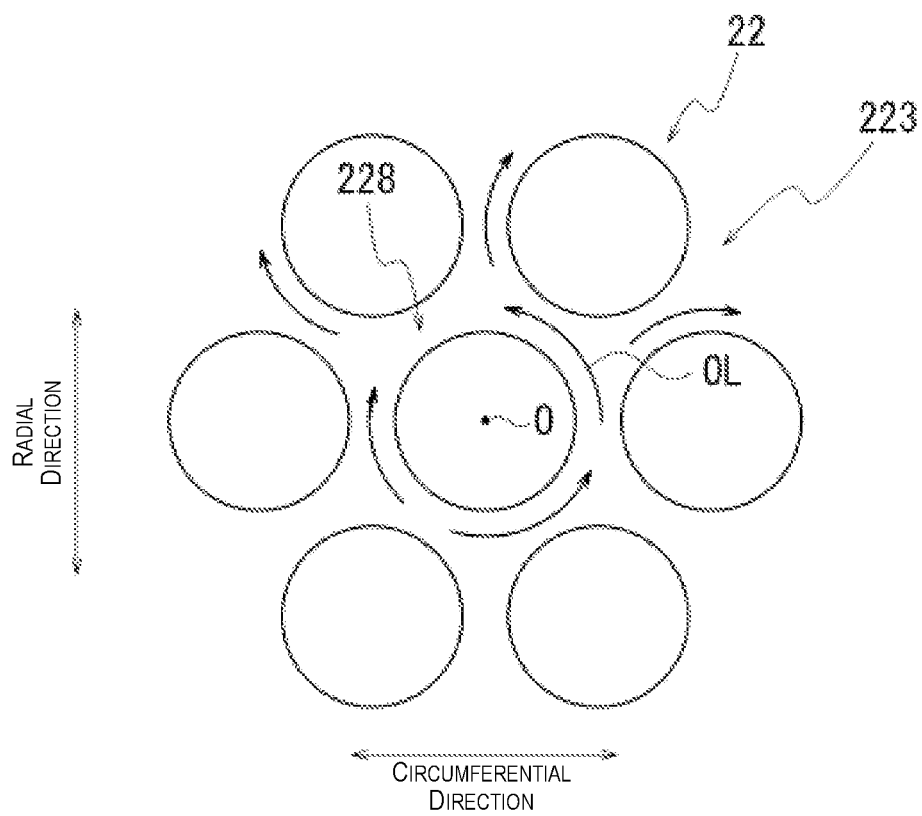
FIG. 9 is a drawing for explaining the configuration of the grooves of Modification Example 2.

FIG. 9 is a drawing for explaining the configuration of the groove 223 of Modification Example 2.

As shown in FIG. 9, the groove 223 may also be constituted by circular grooves 228. The circular grooves 228 are circular grooves when seen from the rotation axis X (see FIG. 4A) direction, and similar to the hexagonal grooves 224, are formed continuously across the entire surface of the surfaces 22*a* and 22*b* of the driven plates 22. As shown in FIG. 9, the circular groove 228 has a portion along the driven plate 22 radial direction and a portion along the circumferential direction, and shares a portion of the groove with the other adjacent circular grooves 228 in the radial direction and the circumferential direction.

As described above, in Modification Example 1, (11) the groove 223 is formed from the circular grooves 228 which are circular grooves when seen from the rotation axis X direction.

The lubricating oil OL flows in the radial direction facing the outer periphery side from the inner periphery side of the drive plates 21 and the driven plates 22, but it also receives centrifugal force due to the rotation of the drive plates 21 and the driven plates 22, and moves in the circumferential direction. By the circular grooves 228 being provided on the surfaces 22*a*, 22*b* of the driven plates 22, it is easier for the lubrication oil OL that flows in the radial direction and the circumferential direction to enter into the groove. Also, the circular grooves 228 are formed at an equal distance from the center O, so it is easier for the lubrication oil OL adhered to the surface to enter evenly into the circular grooves 228.

(12) The circular grooves 228 are formed continuously on the surface of the base 220 of the driven plate 22, and a portion of each circular groove is joined with an adjacent circular groove.

By having the circular grooves 228 formed continuously on the surfaces 22*a*, 22*b* of the driven plates 22, the surface area in which the lubricating oil OL enters is increased, and since it is also possible to exhaust the lubricating oil OL entered into the grooves from between the drive plates 21 and the driven plates 22 via the joined grooves, it is possible to improve oil drainage. The same as with the embodiment, it is also possible to form the circular grooves 228 on the entire surface of the base 220, and this makes processing easier.

With the embodiment and Modification Examples 1 and 2 noted above, examples were explained in which the drive plates 21 are fitted to the clutch hub 24 provided on the inner diameter side of the rotation axis X, and the driven plates 22 are fitted to the clutch drum 25 provided on the outer diameter side of the rotation axis X, but the invention is not limited to this. For example, it is also possible to have the drive plates 21 fitted to the outer diameter side rotor of the rotation axis X, and the driven plates 22 fitted to the inner diameter side rotor of the rotation axis X.

Also, with the embodiment and Modification Examples 1 and 2 noted above, an example was explained of the wet-type friction engaging device of the present invention being applied to the forward clutch 2, but the application examples are not limited to this. For example, the present invention may also be applied to the reverse brake 3, or the lockup clutch of the torque converter of the vehicle. The lockup clutch of the torque converter, the same as with the forward clutch 2, may have multiple plates, or may have a single plate.

Figure 10:
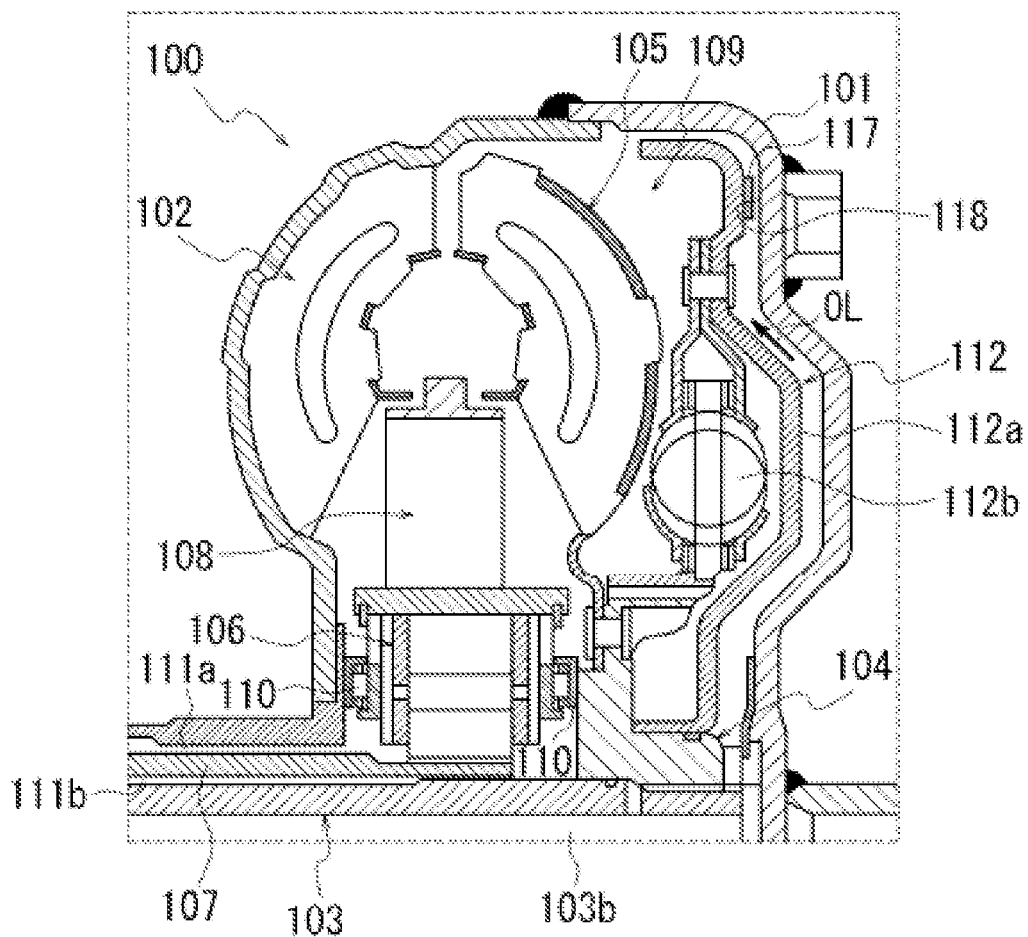
FIG. 10 is a drawing for explaining the configuration of a torque converter.

FIG. 10 is a drawing showing the configuration of a torque converter 100. FIG. 10 shows an example of a lockup clutch 112 as a single plate.

As shown in FIG. 10, the torque converter 100 comprises: a pump impeller 102 linked to an input shaft (not illustrated) in which drive force is inputted with a front cover 101 interposed; a turbine impeller 105 linked to an output shaft 103 with a turbine hub 104 interposed; a stator impeller 108 fixed to a case 107 with a one-way clutch 106 interposed; a converter oil chamber 109 in which the pump impeller 102 and the turbine impeller 105 are housed; a bearing 110; a hydraulic oil inflow passage 111*a*; and a hydraulic oil outflow passage 111*b*.

The lockup clutch 112 comprises a lockup piston 112*a*, and a torsion damper 112*b* that is engaged in the circumferential direction with this lockup piston 112*a*, and spline-engaged to the turbine hub 104. A facing material 117 is provided on the facing surface with the front cover 101 of the outer diameter part of the lockup piston 112*a*. When the lockup clutch 112 is operated, the facing material 117 is pressure-welded and engaged to the front cover 101, and the drive force inputted from the input shaft (not illustrated) is directly transmitted to the output shaft 103.

A groove 118 is provided on the surface facing the lockup clutch 112 of the front cover 101. The groove 118 can be constituted by continuously forming the hexagonal grooves explained with the embodiment or Modification Example 1 or the circular grooves explained with Modification Example 2.

The lubricating oil OL is supplied to the lockup clutch 112 via an oil passage 103*b*, etc. The lockup clutch 112 also, the same as the forward clutch 2, when switching between engagement and release, is temporarily in a slipping state and generates heat. The lubricating oil OL supplies relief pressure and a cooling function to the lockup clutch 112, but the same as with the embodiment, the oil polymerizes when excessive heating of the lubricating oil progresses, and blocking of the pores of the facing material by polymerized oil, etc., may be a cause leading to occurrence of judder.

In light of that, on the surface facing the facing material 117 of the lockup clutch 112 of the front cover 101, the same as with the embodiment, by providing the groove 118, it is possible to obtain the same effect as the embodiment. Specifically, it is possible to use the lockup clutch 112 for the first friction member in the wet-type friction engaging device of the present invention, and to use the front cover 101 for the second friction member. The groove 118 may be provided only on the part facing the facing material 117 of the front cover 101, or may be provided on the entire surface.

It is also possible to use the front cover 101 for the first friction member, and to use the lockup clutch 112 for the second friction member. Specifically, it is also possible to provide the facing material 117 on the front cover 101 side, and to provide the groove 118 on the surface of the facing lockup clutch.

EXPLANATION OF CODES

2: Forward clutch;
21: Drive plate;
21a: One surface;
21b: Other surface;
210: Base;
211: Teeth;
213: Facing material;
213a: Inner peripheral edge;
22: Driven plate;
22a: One surface;
22b: Other surface;
220: Base;
220a: Outer peripheral edge;
220b: Inner peripheral edge;
220c: Opposing part;
220d: Inner diameter part;
221: Teeth;
223: Groove;
224, 224A, 227: Hexagonal groove;
225a: Circumferential groove;
225b, 225c: Radial groove;
227a: Radial groove;
227b, 227c: Circumferential groove;
228: Circular groove;
23: Piston;
24: Clutch hub;
240: Bottom part;
241: Peripheral wall;
241a: Spline peak;
241b: Spline trough;
242: Oil hole;
25: Clutch drum;
250: Bottom part;
251: Peripheral wall;
251a: Spline peak;
251b: Spline trough;
252: Oil hole;
3: Reverse brake;
31: Drive plate;
32: Driven plate;
33: Piston;
4: Planetary gear set;
41: Sun gear;
42: Pinion gear;
43: Ring gear;
44: Carrier;
5: Forward/reverse switching mechanism;
10: Transmission case;
11: Front cover;
100: Torque converter;
101: Front cover;
102: Pump impeller;
103: Output shaft;
104: Turbine hub;
105: Turbine impeller;
106: One-way clutch;
107: Case;
108: Stator impeller;
109: Converter oil chamber;
110: Bearing;
111: Hydraulic oil inflow passage;
111b: Hydraulic oil outflow passage;
112: Lockup clutch;
112a: Lockup piston;
112b: Torsion damper;
113b: Oil passage;
117: Facing material;
118: Groove;
O: Center;
OL: Lubricating oil;
R: Oil chamber; and
X: Rotation axis.

The invention claimed is:

1. A wet-type friction engaging device comprising:
a first friction member;
a plurality of friction facing material pieces arranged on a surface of the first friction member, the friction facing material pieces being spaced apart from each other at equal intervals in a circumferential direction of the first friction member; and
a second friction member including a base, the second friction member defining a groove formed on a surface of the base on a side facing the friction facing material pieces arranged on the surface of the first friction member, wherein
the groove defines a plurality of hexagonal shapes,
the base is arranged on an inner diameter side of the second friction member,
the second friction member further defines a groove on a surface of an outer diameter side of the second friction member,
the groove formed on the surface of the outer diameter side joins with the groove formed on the surface of the base, and
the groove formed on the surface of the outer diameter side is wider than a width of the groove formed on the surface of the base.

2. The wet-type friction engaging device of claim 1, wherein
the second friction member includes an opposing part that faces the friction facing material pieces on the outer diameter side in the base of the second friction member, and
the groove formed on the surface of the base extends continuously from the inner diameter side of the base to the opposing part of the outer diameter side of the base.

3. The wet-type friction engaging device of claim 1, wherein
the groove is formed on an entire surface of the base.
4. The wet-type friction engaging device of claim 1, wherein
the groove extends continuously from an inner peripheral edge of the base to an outer peripheral edge of the base.
5. A wet-type friction engaging device comprising:
a first friction member;
a plurality of friction facing material pieces arranged on a surface of the first friction member, the friction facing material pieces being spaced apart from each other at equal intervals in a circumferential direction of the first friction member; and
a second friction member including a base, the second friction member defining a groove formed on a surface of the base on a side facing the friction facing material pieces arranged on the surface of the first friction member, wherein
the groove defines a plurality of hexagonal shapes,
the groove is formed continuously on the surface of the base of the second friction member, and
corners of each of the hexagonal shapes share corners of adjacent ones of the hexagonal shapes.
6. The wet-type friction engaging device of claim 5, wherein
the base is arranged on an inner diameter side of the second friction member,
the second friction member further defines a groove on a surface of an outer diameter side of the second friction member, and
the groove formed on the surface of the outer diameter side joins with the groove formed on the surface of the base.
7. The wet-type friction engaging device of claim 5, wherein
a size of one of the hexagonal shapes on an outer diameter side of the second friction member is larger than a size of one of the hexagonal shapes on an inner diameter side of the second friction member.
8. The wet-type friction engaging device of claim 7, wherein
the hexagonal shapes become gradually larger from the inner diameter side to the outer diameter side.
9. The wet-type friction engaging device of claim 8, wherein
each of the hexagonal shapes has a circumferential direction width around a rotation axis, and
the circumferential direction width of each of the hexagonal shapes becomes wider from the inner diameter side to the outer diameter side.
10. The wet-type friction engaging device of claim 5, wherein
the second friction member includes an opposing part that faces the friction facing material pieces on an outer diameter side in the base of the second friction member, and
the groove formed on the surface of the base extends continuously from an inner diameter side of the base to the opposing part of the outer diameter side of the base.
11. The wet-type friction engaging device of claim 5, wherein
the groove is formed on an entire surface of the base.
12. The wet-type friction engaging device of claim 5, wherein
the groove extends continuously from an inner peripheral edge of the base to an outer peripheral edge of the base.
13. A wet-type friction engaging device comprising:
a first friction member;
a plurality of friction facing material pieces arranged on a surface of the first friction member, the friction facing material pieces being spaced apart from each other at equal intervals in a circumferential direction of the first friction member; and
a second friction member including a base, the second friction member defining a groove formed on a surface of the base on a side facing the friction facing material pieces arranged on the surface of the first friction member, wherein
the groove defines a plurality of hexagonal shapes, and
each of the hexagonal shapes is defined by a pair of circumferential groove portions extending in a circumferential direction around a rotation axis and adjacent in a radial direction of the rotation axis, and a plurality of radial groove portions that connect opposing end parts of the pair of circumferential groove portions to each other in the radial direction.
14. The wet-type friction engaging device of claim 13, wherein
the base is arranged on an inner diameter side of the second friction member,
the second friction member further defines a groove on a surface of an outer diameter side of the second friction member, and
the groove formed on the surface of the outer diameter side joins with the groove formed on the surface of the base.
15. The wet-type friction engaging device of claim 13, wherein
the second friction member includes an opposing part that faces the friction facing material pieces on an outer diameter side in the base of the second friction member, and
the groove formed on the surface of the base extends continuously from an inner diameter side of the base to the opposing part of the outer diameter side of the base.
16. The wet-type friction engaging device of claim 13, wherein
the groove is formed on an entire surface of the base.
17. The wet-type friction engaging device of claim 13, wherein
the groove extends continuously from an inner peripheral edge of the base to an outer peripheral edge of the base.
18. A wet-type friction engaging device comprising:
a first friction member;
a plurality of friction facing material pieces arranged on a surface of the first friction member, the friction facing material pieces being spaced apart from each other at equal intervals in a circumferential direction of the first friction member; and
a second friction member including a base, the second friction member defining a groove formed on a surface of the base on a side facing the friction facing material pieces arranged on the surface of the first friction member, wherein
the groove defines a plurality of hexagonal shapes, and
each area of the surface of the second friction member surrounded by the groove is smaller than an area of a friction surface of each of the friction facing material pieces demarcated by a plurality of oil passages extending between an inner diameter side and an outer diameter side of the first friction member.
19. The wet-type friction engaging device of claim 18, wherein the base is arranged on an inner diameter side of the second friction member, the second friction member further defines a groove on a surface of an outer diameter side of the second friction member, and the groove formed on the surface of the outer diameter side joins with the groove formed on the surface of the base.

20. The wet-type friction engaging device of claim 18, wherein the second friction member includes an opposing part that faces the friction facing material pieces on an outer diameter side in the base of the second friction member, and the groove formed on the surface of the base extends continuously from an inner diameter side of the base to the opposing part of the outer diameter side of the base.

21. The wet-type friction engaging device of claim 18, wherein the groove is formed on an entire surface of the base.

22. The wet-type friction engaging device of claim 18, wherein the groove extends continuously from an inner peripheral edge of the base to an outer peripheral edge of the base.

* * * * *